(12) United States Patent
Yamaguchi et al.

(10) Patent No.: US 6,458,916 B1
(45) Date of Patent: Oct. 1, 2002

(54) PRODUCTION PROCESS AND PRODUCTION APPARATUS FOR POLYBUTYLENE TEREPHTHALATE

(75) Inventors: Shuji Yamaguchi, Tokuyama; Hidekazu Nakamoto, Kudamatsu; Susumu Harada, Kudamatsu; Norifumi Maeda, Kudamatsu, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/940,430

(22) Filed: Aug. 29, 2001

(51) Int. Cl.[7] .......................... C08G 63/00; C08F 2/00; B32B 27/04
(52) U.S. Cl. ..................... 528/308.6; 422/131; 422/132; 422/134; 422/135; 422/138; 422/188; 422/236; 528/272; 526/64; 526/65; 526/67; 526/71
(58) Field of Search ................................. 422/131, 132, 422/134, 135, 138, 188, 236; 528/272, 308.6; 526/64, 65, 67, 71

(56) References Cited

U.S. PATENT DOCUMENTS 4,680,376 A 7/1987 Heinze et al.

FOREIGN PATENT DOCUMENTS

| JP | 51-81897 | 7/1976 |
|----|----------|--------|
| JP | 52-51495 | 4/1977 |

*Primary Examiner*—Samuel A. Acquah
(74) *Attorney, Agent, or Firm*—Antonelli, Terry, Stout & Kraus, LLP

(57) ABSTRACT

An apparatus for continuously producing polybutylene terephthalate, which comprises a first reactor for reacting an aromatic dicarboxylic acid with a glycol, thereby producing an oligomer, a second reactor for polycondensating the oligomer, thereby preparing a low polymerization product, and a third reactor for further polycondensating the low polymerization product, thereby producing a high molecular weight polyester, where the second reactor is a vertical, cylindrical polymerization vessel having a plurality of concentrical partitioned reaction compartments therein, each of the reaction compartments being provided with stirring blades and a heater, and an outlet for volatile matters being provided at the upper part of the vessel. The second reactor contributes to efficient and continuous production of polybutylene terephthalate having a good quality.

16 Claims, 6 Drawing Sheets

PRODUCTION PROCESS AND PRODUCTION APPARATUS FOR POLYBUTYLENE TEREPHTHALATE

BACKGROUND OF THE INVENTION

1) Field of the Invention

The present invention relates to a process and an apparatus for continuously producing polyester type polymers such as polybutylene terephthalate and polyethylene terephthalate.

2) Related Art

Since polyethylene terephthalate (hereinafter referred to as PBT) resins are excellent in the crystallizing characteristic and also excellent in mechanical properties, electric characteristics and heat resistance, they have been used for applications such as electric machines, electronic parts, mechanical parts and automobiles and their demand has been increased steadily.

Heretofore, for the general PBT production process, a terephthalic acid alkyl ester comprising dimethyl terephthalate as a main ingredient and a glycol comprising 1,4-butanediol (hereinafter referred to as BD) as a main ingredient are placed at an appropriate ratio in a mixing vessel, a transesterification catalyst is added and conditioned and then they are sent to a transesterfication reaction vessel set to a predetermined reaction temperature by a pump. In the transesterification reaction, two or three stirring vessels with stirring blades are disposed in series and methanol formed as reaction by-products, and tetrahydrofuran (hereinafter referred to as THF) formed by decomposition of the methanol formed as reaction by-products and BD and water are separated in a distillation tower. Then, a polymerization catalyst is added and the process proceeds to the polymerizing reaction step. At first, vertical stirring vessels or horizontal stirring vessels are disposed in plurality for the prepolymerization step and, further, a horizontal stirring vessel is disposed as a final polymerization step.

For continuous polycondensation process for polyethylene terephthalate, etc. in a relatively low viscosity range, operated under subatmospheric pressure, a plurality multi-tray type, columnar reactors or a plurality of vertical complete mixing type stirring vessels are used in series as disclosed in JP-A-48-7090. Oligomers of low polymerization degrees formed by esterification reaction or transestericication reaction are continuously fed to one end of such reactors to successively proceed the polycondensation reaction down to the downstream tray or while transferring the oligomers from one stirring vessel to another.

In this connection, the present inventors proposed an apparatus for continuously producing polybutylene terephthalate, which comprises a first reactor for reacting an aromatic dicarboxylic acid comprising terephthalic acid as a main ingredient or a derivative thereof with a glycol comprising 1,4-butanediol as a main ingredient, thereby producing an oligomer with an average degree of polymerization of 2.2 to 5, a second reactor for polycondensating the oligomer from the first reactor, thereby preparing a low polymerization product with an average degree of polymerization of 25 to 40, and a third reactor for further polycondensating the low polymerization product from the second reactor, thereby producing a high molecular weight polyester with an average degree of polymerization of 70 to 130, or further a fourth reactor for further polycondensing the polyester from the third reactor to an average degree of polymerization of 150 to 200, thereby producing a high molecular weight polyester with good heat stability and excellent hydrolysis resistance, reactors without any stirrers by an external power source being used for the first and second reactors (U.S. patent application Ser. No. 09/642587), parts of which are incorporated herein by reference.

In the apparatus, the second reactor is an approximately cylindrical vessel type, flow reactor in a double cylinder structure having an inner cylinder opening in the vessel and an inlet for the process solution at the lower part of the double cylinder structure, the process solution passing through tubes of a shell and tube type heat exchanger provided on the outside of the inner cylinder of the double cylinder structure and thereby heated to a predetermined temperature and passed upwardly to the level of the inner cylinder opening and then flowing down through the inner cylinder while the process solution is stirred with a plurality of doughnut-type trays provided on the inside wall of the outer cylinder, and the vessel is provided with an outlet for volatile matters and reaction by-products at the upper part thereof. The present inventors have found that short pass and thermal decomposition reaction of the process solution admit of improvement.

SUMMARY OF THE INVENTION

An object of the present invention is to provide an apparatus and a method for producing polybutylene terephthalate of good quality efficiently and continuously by providing a plurality of partitioned reaction compartments in the second reactor, each of the reaction compartments being stirred and heated to attain complete mixing, thereby eliminating short pass and thermal decomposition reaction of the process solution.

The object of the present invention can be attained by using, for the second reactor, a vertical cylindrical polymerization vessel having a plurality of concentrical partitioned reaction compartments therein, each of the reaction compartments being provided with stirring blades and a heater, and an outlet for volalite matters being provided at the upper part of the vessel, where polycondensation reaction is efficiently carried out, while the process solution to be treated in the reaction compartments is successively transferred radially and inwardly from the outer reaction compartment to the inner one, whereby preventing occurrence of thermal decomposition reaction and degradation of product quality.

(1) An apparatus for continuously producing polybutylene terephthalate, which comprises a first reactor for reacting an aromatic dicarboxylic acid comprising terephthalic acid as a main ingredient or a derivative thereof with a glycol comprising 1,4-butanediol as a main ingredient, thereby producing an oligomer with an average degree of polymerization of 2 to 5; a second reactor for polycondensating the oligomer from the first reactor, thereby preparing a low polymerization product with a low degree of polymerization; and a third reactor for further polycondensating the low polymerization product from the second reactor, thereby producing a high molecular weight polyester with an average degree polymerization of 70 to 180, or an apparatus for continuously producing polybutylene terephthalate, which comprises a first reactor for reacting an aromatic dicarboxylic acid comprising terephthalic acid as a main ingredient or a derivative thereof with a glycol comprising 1,4-butanediol as a main ingredient, thereby producing an oligomer with an average degree of polymerization of 2 to 5, a second reactor for polycondensating the oligomer from the first reactor, thereby preparing a low polymerization product with a low degree of polymerization; a third reactor for further polycondensating the low polymerization product from the second reactor, thereby producing a high molecular weight polyester with an average degree polymerization of 70 to 130; and a fourth reactor for further polycondensing the polyester from the third reactor to an average degree of polymerization of 150 to 200, thereby producing a high molecular weight polyester, characterized in that (i) the first reactor is an approximately cylindrical vessel type reactor having an inlet and an outlet for a process solution at lower parts, respectively, of the vessel proper and an outlet for volatile matters and reaction by-products at the upper part of the vessel proper, and having a calandria type heat exchanger formed in the longitudinal direction of the vessel proper and near the inside wall of the vessel proper and being immersed in the process solution, the process solution supplied into the vessel proper at the inlet at the lower part thereof is heated to a predetermined reaction temperature by the heat exchanger and is stirred and mixed by spontaneous convection due to a density difference caused by a temperature difference between the formed volatile by-product gas and the process solution, (ii) the second reactor is a vertical cylindrical polymerization vessel having a plurality of concentrated partitioned reaction compartments therein, each of the reaction compartments being provided with stirring blades and a heater, and an outlet for volatile matters being provided at the upper part of the vessel, (iii) the third reactor is a horizontal cylindrical vessel type reactor having an inlet and an outlet for a process solution at lower parts on one end and an another end in the longitudinal direction of the vessel proper, respectively, and an outlet for volatile matters at the upper part of the vessel proper, and a stirring rotor rotating in the proximity of the inside wall of the vessel proper is provided in the longitudinal direction of the vessel proper, the stirring rotor in the vessel proper is provided with a plurality of stirring blade blocks in accordance with the viscosity of the process solution and the stirring blades are without any rotating shaft along the center of the stirring rotor, and (iv) the fourth reactor is a horizontal, approximately cylindrical vessel type reactor having an inlet and an outlet for a process solution at lower parts an one end and an another end in the longitudinal direction of the vessel proper, respectively, and an outlet for volatile matters at the upper part of the vessel proper, the reactor has two stirring rotors rotating in the proximity of the inside wall of the vessel proper in the longitudinal direction of the vessel proper, and the rotors each have stirring blades.

In the second reactor, each of the stirring blades can be fixed to one common half-length rotating shaft.

The second reactor can be a vertical cylindrical polymerization vessel having two partitioned concentrical reaction compartments therein each of reaction compartments being provided with stirring blades and a heating coil, the stirring blades being fixed to one common half-length rotating shaft connected to a driving means mounted on the upper part of the vessel proper, and an outlet for volatile matters being provided at the upper part of the vessel, or can be a vertical cylindrical polymerization vessel having two partitioned concentrical reaction compartments therein, the stirring blades provided in the inner reaction compartment is without any counterpart rotating shaft along the rotation center.

The term "one common, half-length rotating shaft" herein used means a common rotating shaft whose lower end locates above the central reaction compartment without extending into the central reaction compartment. In other words, the stirring blades in the central reaction compartment are without any counterpart rotating shaft therein. Typical embodiments of the present invention are summarized below.

(2) A process for continuously producing polybutylene terephthalate, which comprises producing an oligomer with an average degree of polymerization of 2 to 5 by reaction of an aromatic dicarboxylic acid comprising terephthalic acid as a main ingredient or a derivative thereof with a glycol comprising 1,4-butanediol as a main ingredient and then polycondensing the oligomer in series of a plurality of reactors, thereby producing a polymer of a low degree of polymerization and a high molecular weight polyester, characterized in that production of polymer of a low degree of polymerization by polycondensation of the oligomer is carried out in a vertical cylindrical polymerization vessel (initial polymerization vessel) containing a plurality of partitioned concentrical reaction compartments therein, each of the reaction compartments being provided with stirring blades and a heater, and an outlet for volatile matters being provided at the upper part of the vessel, the polycondensation reaction can be efficiently carried out, while a process solution (oligomer) to be treated in the reaction compartments is successively transferred radially and inwardly from the outer reaction compartment to the inner one, and more specifically, a process for continuously producing polybutylene terephthalate, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2 to 5, a second step of polycondensing the oligomer from the first step in a second reactor, thereby preparing a low polymerization product with an average degree of polymerization of 20 to 70, a third step of further polycondensing the low polymerization product from the second step in a third reactor, thereby producing a high molecular weight polyester with an average degree of polymerization of 70 to 180, or a process for continuously producing polybutylene terephthalate, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2 to 5, a second step of polycondensing the oligomer from the first step in a second reactor, thereby preparing a low polymerization product with an average degree of polymerization of 20 to 70, a third step of further polycondensing the low polymerization product from the second step in a third reactor, thereby producing a high molecular weight polyester with an average degree of polymerization of 70 to 130, and a fourth step of further polycondensing the polyester from the third step in a fourth reactor, thereby producing a high molecular weight polyester with an average degree of polymerization of 150 to 200, characterized in that reactors characterized by (i), (ii), (iii), and (iv) described in the foregoing (1) are used; the aromatic dicarboxylic acid comprising terephthalic acid as a main ingredient or a derivative thereof and the glycol comprising 1,4-butanediol as a main ingredient are supplied to the first step in a molar ratio of the former to the latter of 1:1.7 to 1:3.0, and the first step is carried out at 220°–250° C. and 33 kPa–150 kPa, the second step at 230°–255° C. and 0.5 kPa–20 kPa and the third and fourth step each at 230°–255° C. and 0.665 kPa–0.067 kPa; the stirring blades of the second reactor is rotated in a range of 5 ppm–100 ppm; the stirring blades of the third and fourth reactors are rotated in a range of 0.5 rpm–10 rpm; total reaction time for the first to the third steps is in a range of 4–7.5 hours, or total reaction time for the first to the fourth step is in a range of 6 to 8.5 hours; a slurry of the aromatic dicarboxylic acid comprising terephthalic acid as a main ingredient or a derivative thereof and the glycol comprising 1,4-butanediol as a main ingredient prepared in a ratio of the former to the latter of 1:1.7 to 1:3.0 is supplied to the first step upon admixture of an esterifying catalyst or a polymerization reaction catalyst; and another third reactor or a plurality of third reactors is provided in parallel to the third reactor in the third step, thereby producing different kinds of polybutylene phthalate with different degrees of polymerization from that produced in the main line of the third and fourth reactors or adjusting operating conditions of each of a plurality of the third reactors to increase kinds, precise quality control and production rate of polybutylene terephthalate.

PREFERRED EMBODIMENTS OF THE INVENTION

Figure 1:
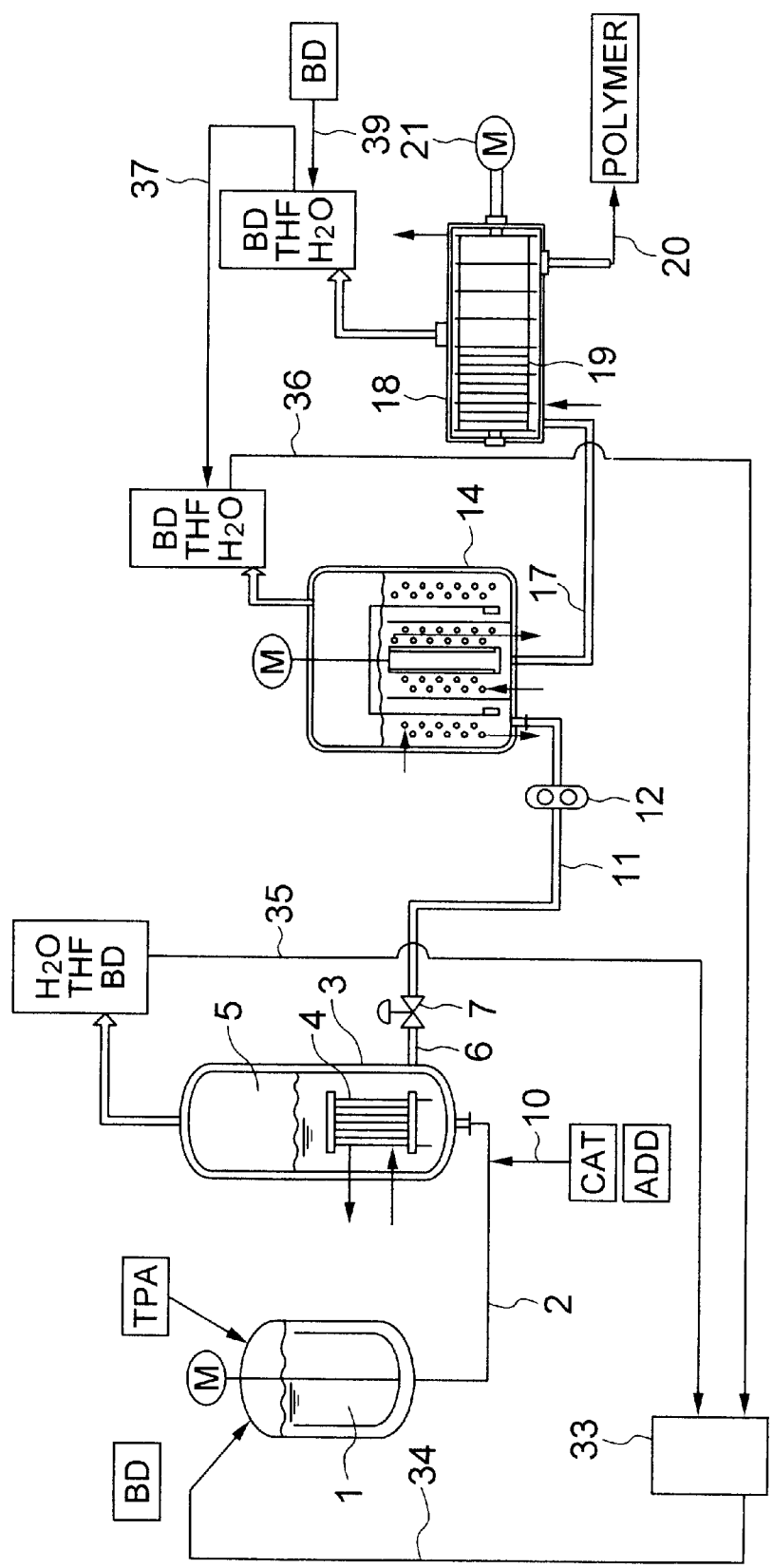
FIG. 1 shows an apparatus layout in a process for continuously producing PBT according to one embodiment of the present invention.

FIG. 1 shows an embodiment of this invention.

FIG. 1 is an apparatus layout of a process for continuously for the producing PBT according to this invention. Since a direct esterifying process is very advantageous from an economical point of view as an industrial process for producing a polyester, the direct esterifying process has been often adopted recently for the production of polyesters. In FIG. 1, reference numeral 1 denotes a starting material conditioning vessel for mixing and stirring TPA and BD as the starting materials for PBT in a predetermined ratio. In the process, a polymerizing reaction catalyst or additives such as a stabilizer or a quality controller are sometimes added in this step and, in this embodiment, the polymerizing reaction catalyst or the additive is charged to starting material supply line 2 just before the inlet of an esterifying reaction vessel from catalyst supply line 10 and supplied to the esterifying reaction vessel. The polymerizing reaction catalyst can include metal compounds such as organic titanium, organic tin, organic zirconia, etc. and it is well known the reaction rate depends on the kind and the combination of the catalyst to be used, as well as they give a significant effect on the quality such as hue and the heat stability of the resultant PBT. In particular, it is well known that the catalyst of the organic titanium compound is influenced with the ambient moisture to decrease the catalytic effect. In order to minimize the effect, the catalyst is added to the point just before the inlet of the esterifying reaction vessel in this embodiment. Since this can minimize the rate of deactivation of the added catalyst, it is possible to decrease the amount of the catalyst charged and produce a resin of good hue. Further, since the reactions are carried out in the presence of the catalyst at high temperature for a long time, various side-reactions take place to color the polymerization product, increase the THF content or the terminal carboxyl group concentration to higher than the appropriate values, thereby deteriorating the quality of PBT or lowering the physical properties such as the strength, etc. While a development for new catalyst has been attempted for improving such problems, organic titanium used most frequently at present in the industry is excellent in view of the cost and the performance. However, the resultant polyester polymer product is inevitably colored even when the catalyst is used. Therefore, improvement has been attempted by the combined use of a phosphorus type stabilizer (for example, phosphoric acid, trimethyl phosphate, triphenyl phosphate, etc.) as the stabilizer. Further, in another process the quality is stabilized by modifying the position for charging the polymerization catalyst and the stabilizer. Preferably, in the ordinary process, the amount of the catalyst used is from 20 to 100 ppm in terms of metallic titanium concentration and the amount of the stabilizer used is from 0 to 600 ppm in terms of metallic phosphorus concentration, if required.

The starting material and the catalyst prepared as described above are supplied to the first esterifying reaction vessel 3 through supply line 2 for supplying the starting material and through catalyst addition line 10 for the catalyst prepared separately, which joins supply line 2, respectively. The outside of the esterifying reaction vessel (first reactor) 3 is in a jacket structure (not illustrated) to keep the process solution at the reaction temperature, calandria type heat exchanger 4 is disposed in the solution as a solution heating unit, thereby heating the process solution flowing in the tubes by an external heat source, thereby conducting the reaction while circulating the internal solution only by the spontaneous circulation due to a synergistic effect between the change of the density caused by the volatile gas formed in the esterifying reaction step and the temperature difference. The most desired type of reactor 3 is a calandria type for spontaneously circulating the process solution in the reactor by utilizing the spontaneous evaporating action of side reaction products formed by the esterifying reaction. Since the reactor of this type does not require an external stirring power source, it has a merit that the apparatus layout can be simplified, a shaft sealing device for a stirring shaft is no more required and the fabrication cost of the reactor is reduced. As an example of such reactor, a device as shown in JP-A-108-5501 is desirable. However, the present invention is not limited to such a device, and it is not objectionable to use a reactor having a stirring blade for a process reason. In first reactor 3, water formed by reaction takes a steams form, which makes gas phase 5 together with gasified BD vapors and by-produced THF vapors. A temperature from 220° C. to 250° C. and a subatmospheric pressure or slightly superatmospheric pressure are preferable conditions. In particular as to the pressure condition, an optimum pressure condition is determined in accordance with BD-TPA molar ratio of the starting materials (hereinafter referred to as B/T). In B/T=2.0 or higher, the BD concentration in the process solution can be ensured even under a pressure higher than the atmospheric pressure, the desired esterifying ratio can be reached within a predetermined residence time. However, in B/T=less than 2.0, the esterifying ratio is lowered to increase the reaction load in the subsequent polymerization steps and bring about a problem of causing disadvantage in a vacuum system and auxiliaries relevant thereto. Accordingly, at B/T=less than 2.0, it is effective to set the reaction pressure to a subatmospheric pressure. The pressure reduction can lower the boiling point of BD and lower the reaction temperature. Usually, the reaction rate lowers when the reaction temperature is lowered, but in the spontaneous circulation type reactor of such a structure as in this embodiment, the pressure reduction increases the reaction by-product gas volume to improve the circulating performance within the reactor and give an effect on the improvement of the reaction condition. Further, the pressure reduction can also improve the leaving rate of moisture as a by-product of the esterifying reaction and make a forward reaction rate constant larger. Further, the effects on shortening the esterifying reaction time and decreasing the amount of THF as the side-reaction product become remarkable by the improvement in the esterifying reaction rate with a synergistic effect on lowering the reaction temperature, and thus the amount of THF formed can be reduced remarkably.

Preferable reaction temperature in this case is from 220° C. to 250° C. and, particularly, under subatmospheric pressure of 50 to 80 kPa, the residence time of 1.5 to 2.4 hrs and reaction temperature of 225° C. to 230° C. are remarkably effective for the improvement of the esterifying reaction rate and the decrease of the amount of THF formed. The amount of THF formed in this case is about 15 to 25 mol%/h in terms of molar fraction of the starting material TPA. The gas of the gas phase zone 5 as a volatile component leaving the process solution is separated into water, THF and BD by a distillation column (not shown) disposed above first esterifying reaction vessel 3. Water and THF are removed from the system, and BD is returned through a purification step etc. again into the system or as the starting material to BD tank 33 from the bottom of the distillation column through BD recycle line 35. The recycle BD is supplied to starting material conditioning vessel 1 from BD tank 33 through BD supply line 34, and the recycle BD in BD tank 33 is subjected to purify adjustment of the starting material BD by BD purification treatment (not shown), if required. Furthermore, the recycle BD discharged from wet condensers (not shown) at pressure reduction devices disposed at initial polymerization vessel 14 and final polymerizer 18 is returned to BD tank 33 through BD recycle line 36 to further improve the BD unit. In that case, fresh BD is supplied to the wet condenser at final polymerizer 18 through fresh BD supply line 39, then to the wet condenser at initial polymerization vessel 14 through BD recycle line 37, and to BD tank 33 through BD recycle line 36.

The process solution reaching a predetermined esterifying ratio in esterifying reaction vessel 3 is supplied through connection pipe 6 to initial polymerization vessel (second reactor) 14. Control valve 7 is disposed to adjust the flow rate of the process solution at the midway of connection pipe 6. Valve 7 controls the first reactor to a constant liquid level and keeps a constant reaction time. The process solution, when reached a predetermined esterifying ratio in esterifying reaction vessel 3, is supplied to initial polymerization vessel (second reactor) 14 by oligomer pump 12 disposed in the midway of connection pipe 11.

Figure 4:
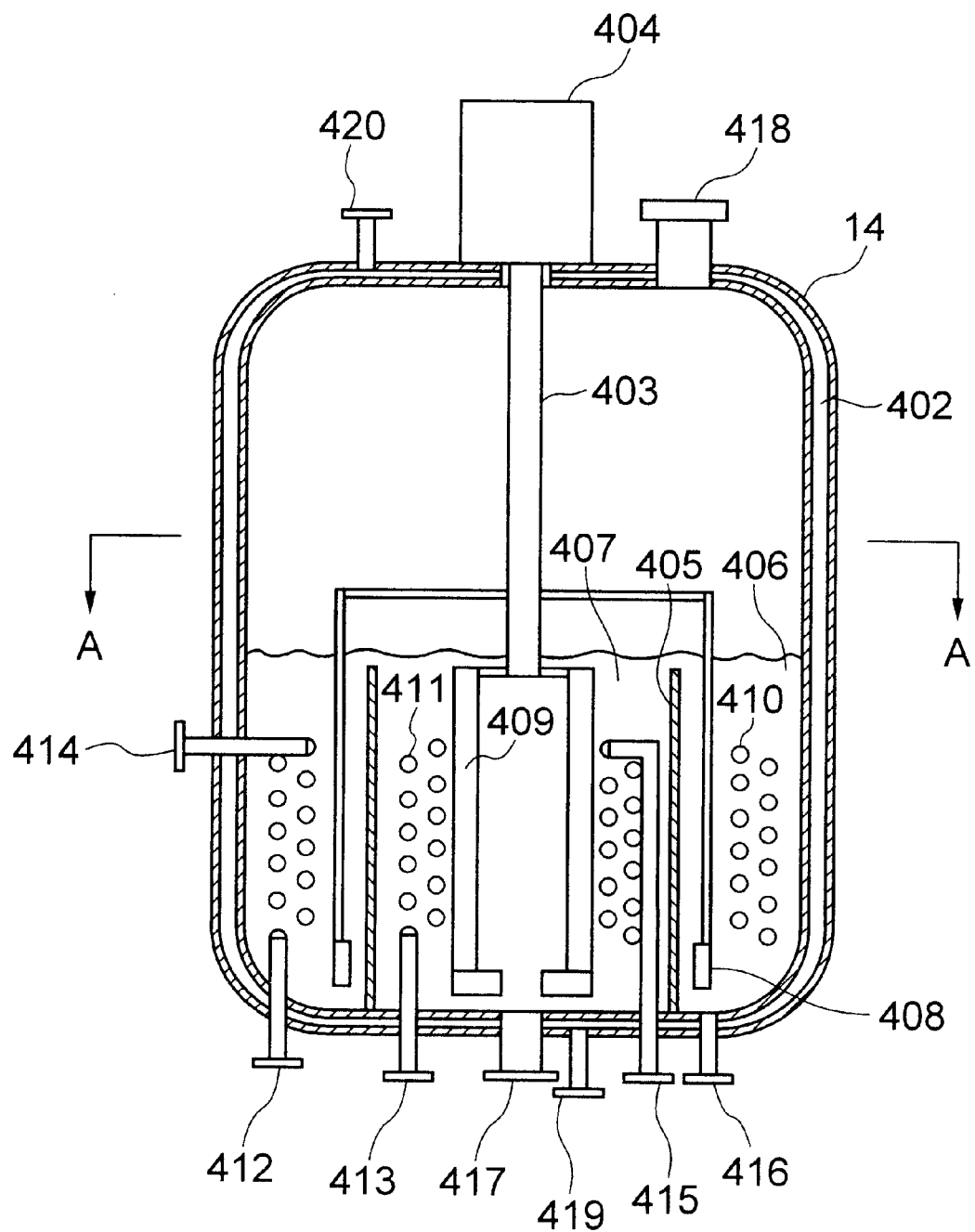
FIG. 4 is a vertical cross-sectional front view showing a second reactor (initial polymerization vessel) according to one embodiment of the present invention.
Figure 5:
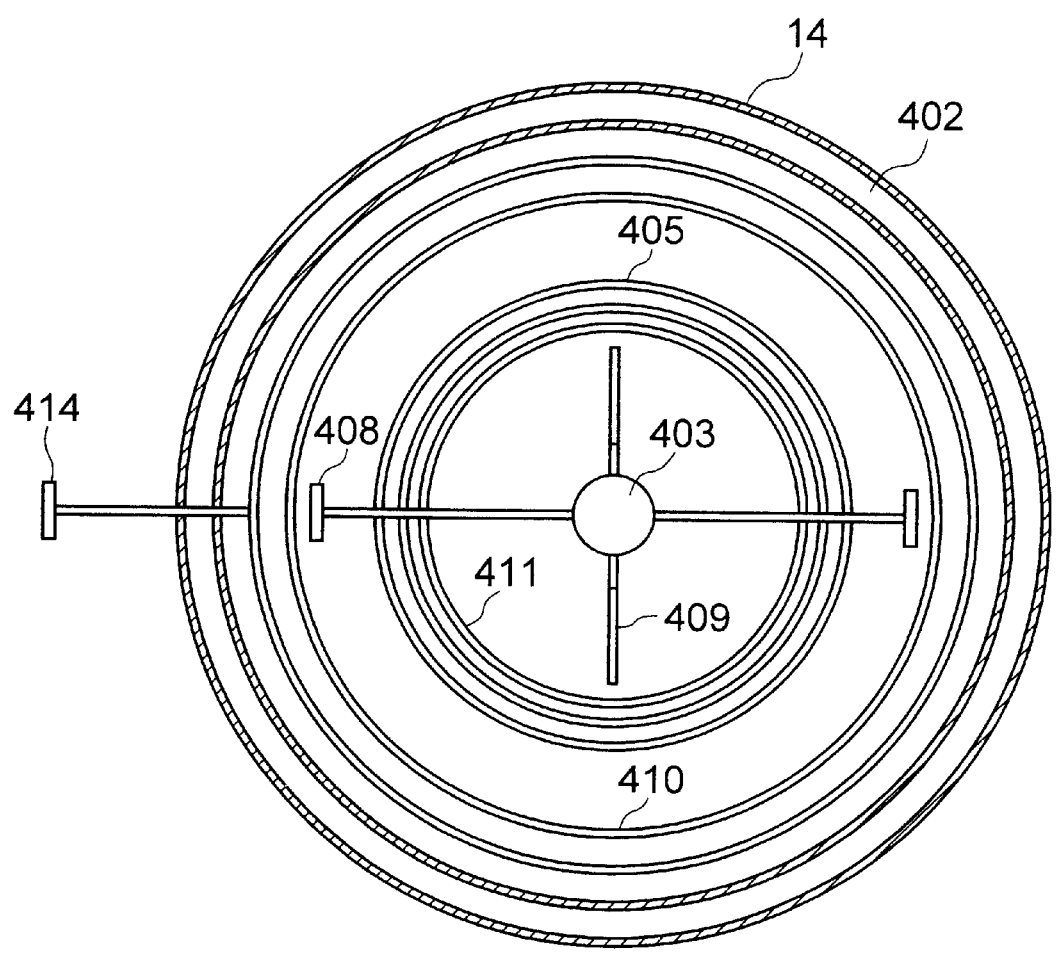
FIG. 5 is a horizontal cross-sectional view along the line A—A of FIG. 4.

FIG. 4 and FIG. 5 show a second reactor (initial polymerization vessel) according to one embodiment of the present invention, where FIG. 4 is a vertical cross-sectional front view and FIG. 5 is a horizontal cross-sectional view along the line A-A of FIG. 4.

In FIG. 4, numeral 14 denotes a vertical cylindrical closed vessel proper, whose outside is covered with heating medium jacket 402, and rotating shaft 403 and driving means 404 are provided at the upper part of the center of vessel proper 14. Vessel proper 14 has two concentrical compartments partitioned by partitioning cylinder 405 therein, that is, doughnut-type first compartment 406 and cylindrical second compartment 407. Stirring blades 408 and 409 for stirring said first and second compartments 406 and 407, respectively, by rotation are fixed to one common, half-length rotating shaft 403, that is, a rotating shaft whose lower end of a locates above second compartment 407 without extending into second compartment 407. Furthermore, heating tubular coils 410 and 411 are provided at the outsides of stirring blades 408 and 409 in. first compartment and second compartment 406 and 407, respectively. Heating medium inlet nozzles 412 and 413 and heating tubular coils 410 and 411, respectively, are provided through vessel proper 14. At the lower part of first compartment 406 of vessel proper 14 is provided process solution inlet nozzle 416 while at the lower part at the center of second compartment 407 of vessel proper 14 is provided process solution outlet nozzle 417. Furthermore, outlet nozzle 418 for volatile matters is provided at the upper part of vessel proper 14 and is connected to a condenser and an evacuator through a piping (not shown in the drawing). 419 and 420 denote heating medium inlet and outlet, respectively, to and from heating medium jacket 402.

Stirring blades 408 in first compartment 406 rotate at a higher peripheral speed than stirring blades 409 in second compartment 407 rotate, and thus the process solution in first compartment 406 is stirred in a slim state of low stirring resistance, whereas the process solution in second compartment 407 is stirred in a broad state of high stirring resistance because of lower peripheral speed of stirring blades 409 in second compartment 407, whereby stirring blades 408 and 409, which rotate at the same rpm, can give the same level of stirring effect in first and second compartments 406 and 407. Furthermore, stirring blades 409 is without any counterpart rotating shaft at the rotating center in second compartment 407, and thus there is no fear at all of deposition of the process solution onto the rotating shaft and the resulting deterioration thereon.

In the second reactor, the process solution continuously fed through inlet nozzle 416 enters at first compartment 406, heated by heating tubular coil 410 and stirred by stirring blades 408 while proceeding with polycondensation reaction, and the generated volatile matters such as 1,4-butanediol, etc. are evaporated and trapped by a condenser (not shown in the drawing) through outlet nozzle 418 for volatile matters. The reaction-proceeded process solution enters second compartment 407 over the upper edge of partition cylinder 405 from first compartment 406. The process solution is also heated by heating tubular coil 411 and stirred by stirring blades 409 in second compartment 407 in the same manner as in first compartment 406, while further proceeding with the polycondensation reaction. The generated volatile matters such as 1,4-butanediol, etc. are evaporated and trapped by the condenser through outlet nozzle 418.

The reaction-proceeded process solution is led to successive final polymerizer 18 from the lower part of second compartment 407 through outlet nozzle 417 for the process solution. The polycondensation reaction of the process solution proceeds efficiently in a complete mixing state in both two first and second compartments 406 and 407 in vessel proper 14 without any short pass or without any thermal decomposition in both two first and second compartments 406 and 407 because of any provion of closed connection tubes between the two compartments. Thus, the second reactor can contribute to continuous production of high quality polybutylene terephthalate polymerization products.

In the polycondensation reaction of polybutylene terephthalate in the second reactor, bishydroxybutyl terephthalate having an average degree of polymerization of 2 to 5 is continuously fed to vessel proper 14 through inlet nozzle 416 to proceed with polycondensation reaction, while separating generated 1,4-butandediol and water vapors within vessel proper 14, and polymerization products of polybutylene terephthalate having an average degree of polymerization of 20 to 70 can be obtained. The generated volatile matters such as 1,4-butanediol, etc. are discharged through outlet nozzle 418 for volatile matters. The second reactor is operated under the following conditions: liquid temperature: 230°–255° C., pressure: 0.5 to 20 kPa; rotation of stirring blades: 5–100 rpm.

Figure 6:
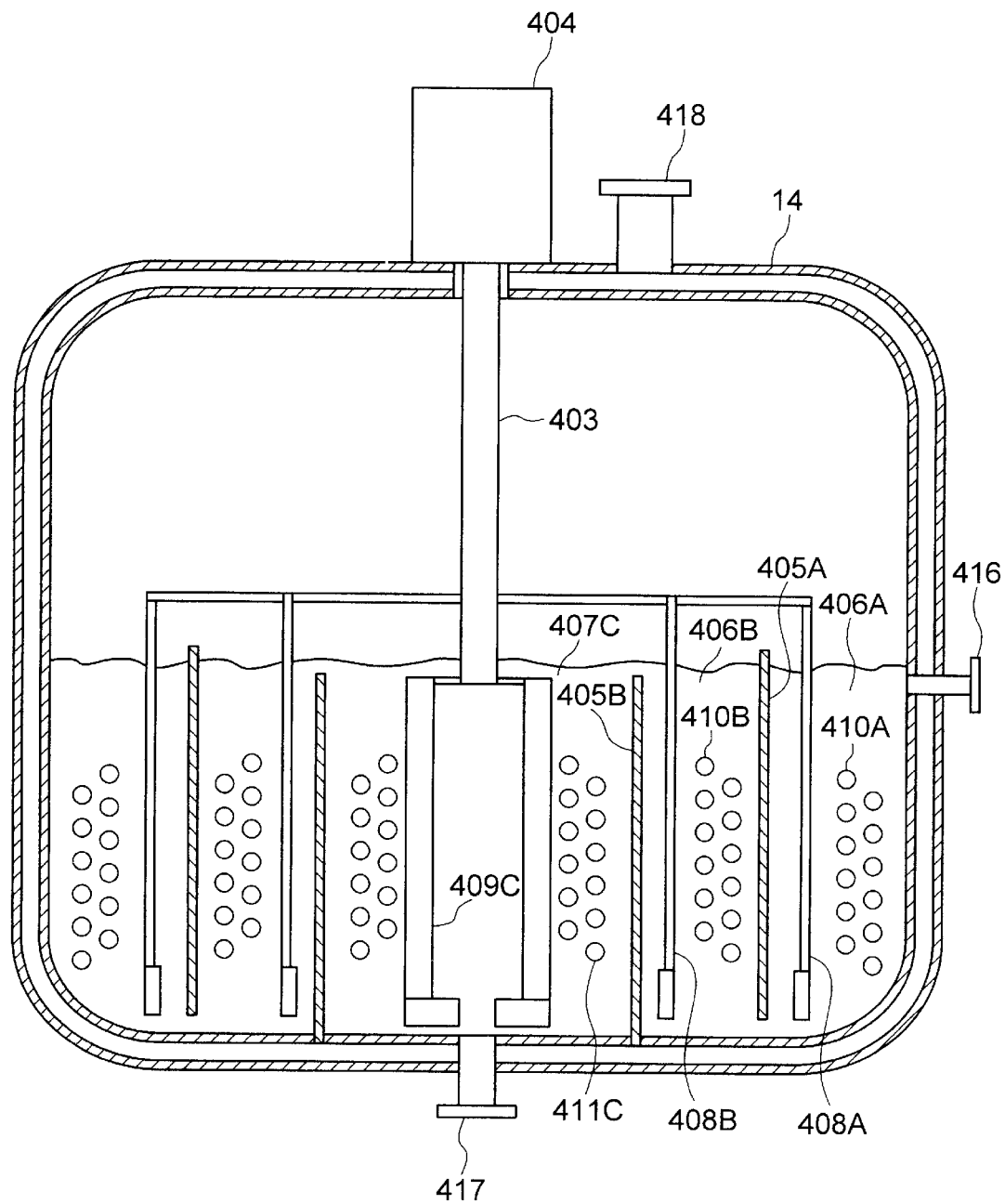
FIG. 6 is a vertical cross-sectional front view showing a second reactor (initial polymerization vessel) according to another embodiment of the present invention.

According to another embodiment of the present invention, as shown in FIG. 6, vessel proper 14 has three compartments partitioned by two partitioning cylinders 405A and 405B, that is, doughnut-shaped first compartment 406A, doughnut-shaped second compartment 406B, and cylindrical third compartment 407C therein, and stirring blades 408A, 408B and 409C, which stir first compartment 406A, second compartment 406B and third compartment 407C by rotation, respectively, are fixed to one common, half-length rotating shaft 403. Heating tubular coils 410A, 410B and 411C are provided in first, second and third compartments 406A, 406B and 407C, respectively. In this embodiment, the process solution enters first compartment 406A through inlet nozzle 416 at the side of vessel proper 14 and enters second compartment 406B through the clearance between the lower edge of partitioning cylinder 405A and the bottom of vessel proper 14, then enters third compartment 407C over the upper edge of partitioning cylinder 405B and leaves vessel proper 14 through outlet nozzle 417 for the process solution at the lower part of third compartment 407C.

In this embodiment, vessel proper 14 act as three complete mixing vessels, and thus can proceed with polycondensation reaction for a shorter time, and can contribute to continuous production of polymerization products of polybutylene terephthalate with better quality and less heat degradation.

The process solution after a predetermined residence time (reaction time) in initial polymerization vessel (second reactor) 14 is supplied through connection pipe 17 to final polymerizer (third reactor) 18. In the final polymerizer, polymer of desired polymerization degree is produced by further polycondensating reaction, while undergoing a good surface renewing effect by stirring blades 19 with no stirring center shaft driven by external power source 21, thereby increasing the degree of polymerization. A suitable apparatus for the final polymerizer (third reactor) is an apparatus disclosed in JP-A-10-77348 from the viewpoint of the surface renewing effect and the power consumption characteristic. The reaction is conducted to a degree of polymerization of about to about 130 in this case under such reaction conditions as 230° C. to 255° C. and a pressure of 0.665 kPa to 0.067 kPa. Polycondensation has been so far carried out in two vessels due to a wide range of viscosity of the process solution, the present final polymerizer can carry out polycondensation in a single unit, thereby greatly reducing the apparatus cost. Total residence time for the first to third reactors is 4–7.5 hours but from the viewpoint of the quality, the residence time throughout the entire polymerizing steps is preferably in a range from 2 to 4 hours. Further, the residence time can be made longer by adjusting the temperature and the pressure, if required, and, for example, in case of reducing the production rate to minimize the quality fluctuation. In particular, to keep an acid value of polymer as one of PBT evaluation items as low as possible, it is desirable that the reaction temperature is 250° C. or lower.

When PBT is produced continuously according to the foregoing apparatus layout, the number of reactors is decreased, as compared with the conventional apparatus layout, and thus the apparatus fabrication cost can be reduced, and the number of distillation columns and condensers relevant to the apparatus can be also reduced due to the decrease in the number of the apparatus units. Their connection piping, instrumentation parts and valves can be omitted largely, and utility costs for evacuation means, heating medium means are greatly reduced as well, thereby lowering the running cost as another advantage.

Figure 2:
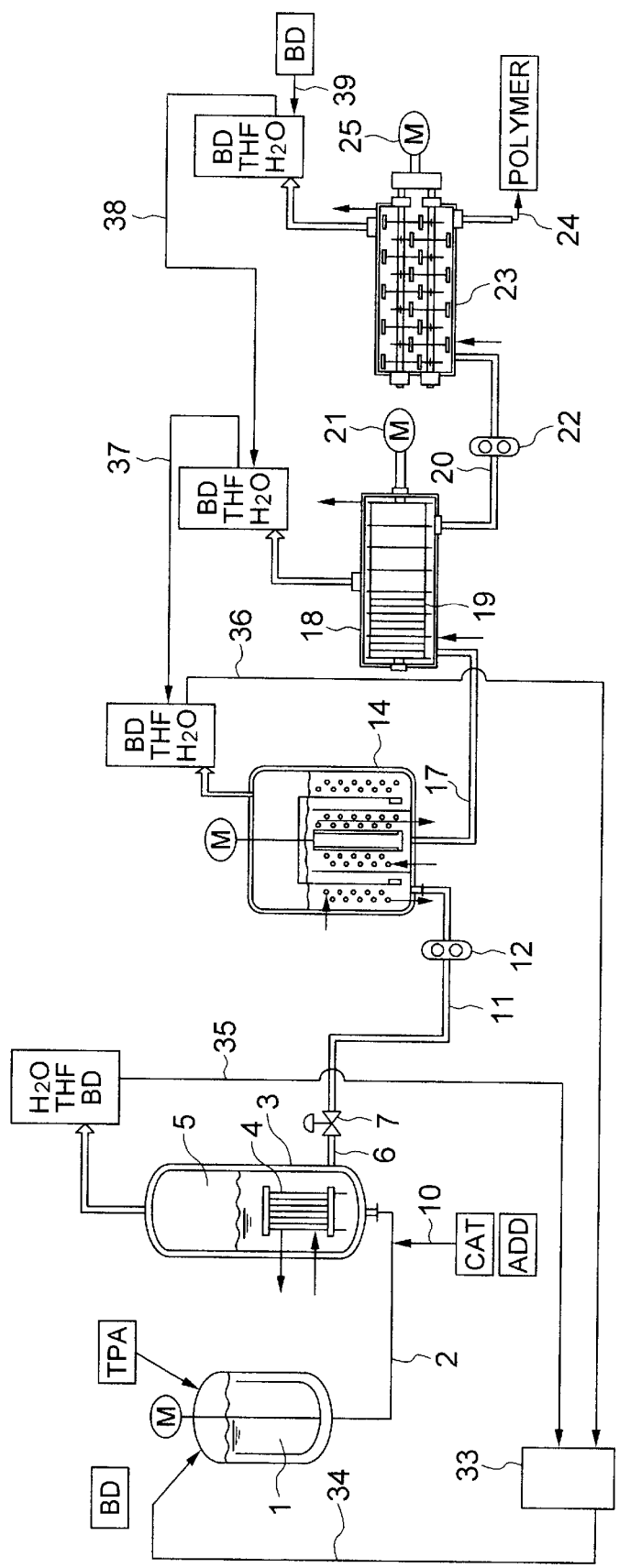
FIG. 2 shows an apparatus layout in a process for continuously producing PBT according to another embodiment of the present invention.

Further, to obtain PBT of higher intrinsic viscosity (IV) another final polymerizer (fourth reactor) can be provided after final polymerizer (third reactor) 18. This embodiment is shown in FIG. 2. Apparatus layout and functions of first, second and third reactors are the same as described above, referring to FIG. 1 and thus their description is to be omitted below. Fresh BD is supplied to a wet condenser at fourth reactor 23 and then through BD recycle line 38 to the wet condenser at third reactor 23, followed by the same functions as in the embodiment of FIG. 1. Process solution 20 having a degree of polymerization of about 70 to about 130 obtained in the third reactor is supplied to fourth reactor 23 by polymer pump 22 at the midway of the connection pipe between third reactor 18 and fourth reactor 23. Since the process solution has such a high viscosity as a few hundred kPas in fourth reactor 23, the same stirring device as used in third reactor 18 is no more used, because a rotation phenomenon, i.e. attachment and staying of the process solution on rotating stirring blades, occurs. That is, a reactor with a stirring device for a high viscosity solution must be used. A suitable reactor is a biaxial reactor for high viscosity solution treatment as disclosed in JP-B-6-21159 and JP-A-48-102894.

In this embodiment, description will be made below, referring to a binocular spectacle rim-type polymerizer disclosed in JP-A-48-102894 (Japanese Patent No. 1024745), but the present invention will not be limited thereto. Fourth reactor 23 is a biaxial polymerization reactor with two stirring shafts each having binocular spectacle rim-type stirring blades 24 as fixed thereto alternately with a phase difference of 90° and at specific distances therebetween, the two stirring shafts being set to each other alternately with a phase difference of 90 ° and driven by external power source 25. The process solution supplied from the inlet port is pushed and extended outwardly due to the stirring blade rotating action from the center to the outward direction, where the process solution undergoes a good surface renewing action, thereby evaporating the volatile components from the inside of the process solution and promoting the reaction, with the result of further increase in the viscosity. The process solution is then discharged as polymer 24 having a higher degree of polymerization. The reaction is conducted to a polymerization degree of about 150 to 200 under such reaction conditions as temperature of 230° C. to 255° C., pressure of 0.665 kPa to 0.067 kPa and residence time of 0.7 to 1.5 hours.

Figure 3:
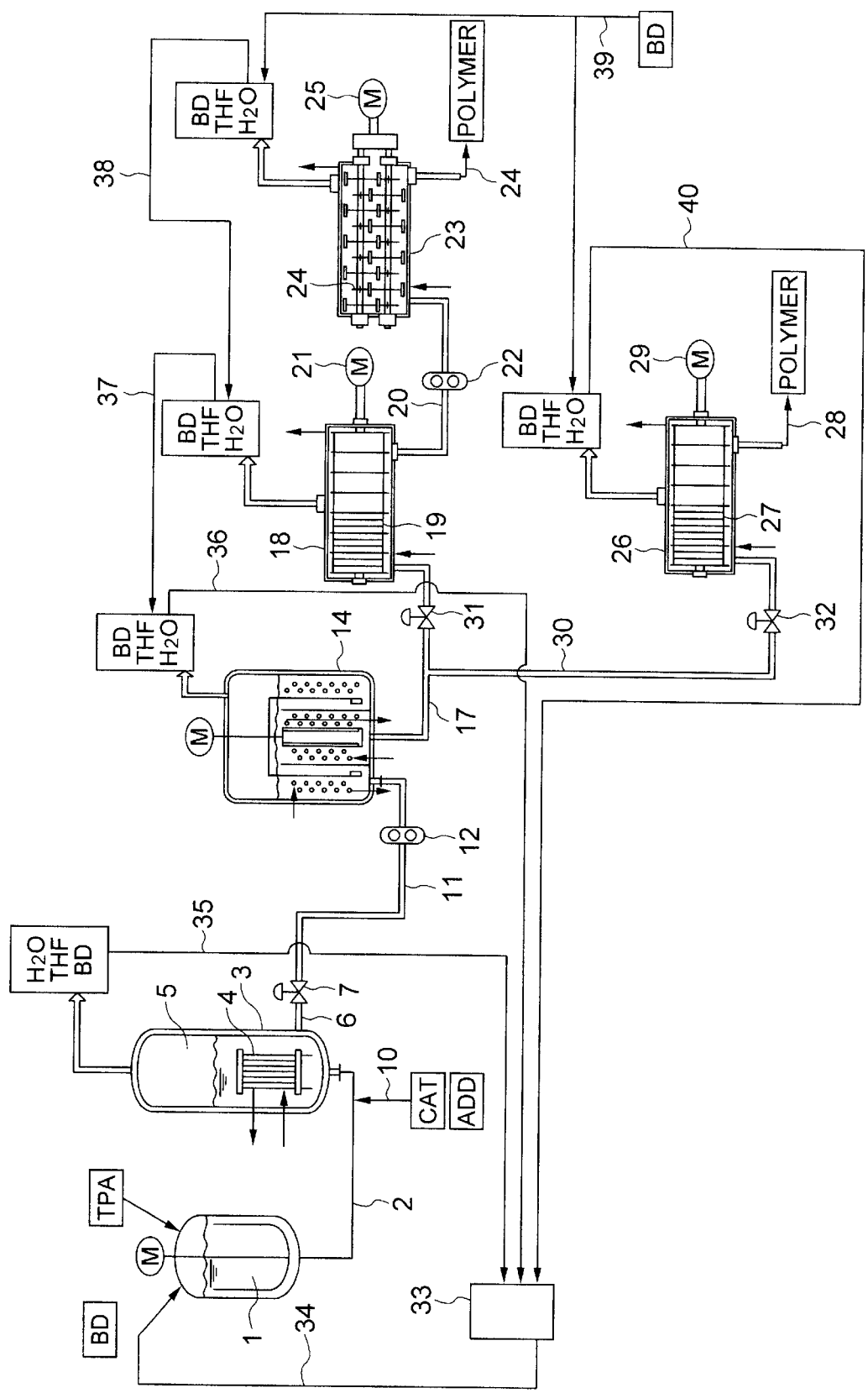
FIG. 3 shows an apparatus layout in a process for continuously producing PBT according to other embodiment of the present invention.

An embodiment of producing different kinds of polybutylene terephthalates at the same time will be described below, referring to FIG. 3. The embodiment of FIG. 3 shows disposition of another third reactor 26 in parallel to the facility of producing polybutylene terephthalate with a high degree of polymerization shown in FIG. 2. Fresh BD is supplied to the wet condensers at fourth reactor 23 and at third reactor 26, respectively, through supply line 39 and finally collected into BD tank 33 through BD recycle lines 38, 37 and 36, as described in the embodiments of FIG. 1 and FIG. 2, and also through BD recycle line 40, respectively. Third reactors 18 and 26 will be described below, referring to the reactor as explained in the embodiment of FIG. 1, but the present invention will not be limited to such a reactor. The process solution leaving second reactor 14 is divided at the midway of connection pipe 17 and one portion of the process solution is led to third reactor 18 through flow control valves 31 and another divided portion of the process solution is led to third reactor 26 through branch connection pipe 30 and flow control valve 32, respectively. This embodiment shows the division into two portions of the process solution, but the present invention will not be limited thereto.

The one portion of the process solution is passed through third reactor 18 and fourth reactor 23 to produce polybutylene terephthalate with a high degree of polymerization. The other divided portion of the process solution was passed through third reactor 26 to produce polybutylene terephthalate with a lower degree of polymerization. This series of the product polybutylene terephthalates can be produced in any desired proportion by adjusting flow control valves 31 and 32. A further third reactor can be provided, though not shown in the drawing, to produce a different kind of polybutylene terephthalate, e.g. with a different acid value but the same degree of polymerization or produce polybutylene terephthalate with a little different degree of polymerization or adjust the production rate by setting different reaction conditions from those for third reactor 26. The stirring blades of the third and fourth reactors are rotated in a range of 0.5 rpm–10 rpm.

According to the present invention, the second reactor can contribute to efficient and continuous production of polybutylene terephthalate having a good quality by intensively conducting complete mixing of process solution in at least two partitioned reaction compartments, while transferring the process solution from one reaction compartment to another by overflow or spontaneous flow without using any piping or transfer means, thereby eliminating occurrence of short pass and thermal decomposition of the process solution therein.

According to the present invention, the entire apparatus efficiency can be improved by making an apparatus for continuously producing PBT from total 3 reactors, i.e. one for the direct esterifying step, one for the initial polymerizing step and one for the final polymerizing step, together with an economical operation of the apparatus due to the resulting energy saving.

Furthermore, according to the present invention, PBT with a high degree of polymerization can be produced through bulk polymerization by adding a reactor for high viscosity treatment to an apparatus for continuously producing PBT comprising total 3 reactors, i.e. one for the direct esterifying step, one for the initial polymerizing step and one for the final polymerizing step, together with the energy saving of the apparatus.

Still furthermore, according to the present invention, different kinds of PBT can be produced by dividing the production line following the second reactor of an apparatus for continuously producing PBT into a production line for higher degree of polymerization and another production line for a lower degree of polymerization. Yield of such different kinds of PBT can be adjusted together with economical operation of the apparatus for continuously producing PBT.

What is claimed is:

1. An apparatus for continuously producing polybutylene terephthalate, which comprises a first reactor for reacting an aromatic dicarboxylic acid comprising terephthalic acid as a main ingredient or a derivative thereof with a glycol comprising 1,4-butanediol as a main ingredient, thereby producing an oligomer with an average degree of polymerization of 2 to 5; a second reactor for polycondensating the oligomer from the first reactor, thereby preparing a low polymerization product with a low degree of polymerization; and a third reactor for further polycondensating the low polymerization product from the second reactor, thereby producing a high molecular weight polyester with an average degree of polymerization of 70 to 180, where the second reactor is a vertical, cylindrical polymerization vessel having a plurality of concentrical partitioned reaction compartments therein, each of the reaction compartments being provided with stirring blades and a heater, and an outlet for volatile matters being provided at the upper part of the vessel.

2. An apparatus for continuously producing polybutylene terephthalate, which comprises a first reactor for reacting an aromatic dicarboxylic acid comprising terephthalic acid as a main ingredient or a derivative thereof with a glycol comprising 1,4-butanediol as a main ingredient, thereby producing an oligomer with an average degree of polymerization of 2 to 5, a second reactor for polycondensating the oligomer from the first reactor, thereby preparing a low polymerization product with a low degree of polymerization; a third reactor for further polycondensating the low polymerization product from the second reactor, thereby producing a high molecular weight polyester with an average degree of polymerization of 70 to 130; and a fourth reactor for further polycondonsing the polyester from the third reactor, thereby producing a high molecular weight polyester with an average degree of polymerization of 150 to 200, where the second reactor is a vertical cylindrical polymerization vessel having a plurality of concentrical partitioned reaction compartments therein, each of the reaction compartments being provided with stirring blades and a heater, and an outlet for volatile matters being provided at the upper part of the vessel.

3. An apparatus according to claim 1 or 2, wherein the first reactor is an approximately cylindrical vessel type reactor having an inlet and an outlet for a process solution at lower parts, respectively, of the vessel proper and an outlet for volatile matters and reaction by-products at the upper part of the vessel proper, and having a calandric type heat exchanger formed in the longitudinal direction of the vessel proper and near the inside wall of the vessel proper and being immersed in the process solution, the process solution supplied into the vessel proper at the inlet at the lower part thereof is heated to a predetermined reaction temperature by the heat exchanger and being stirred and mixed by spontaneous connection due to a density difference caused by a temperature difference between the formed volatile by-product gas and the process solution.

4. An apparatus according to claim 1 or 2, wherein the third reactor is a horizontal cylindrical vessel type reactor having an inlet and an outlet for a process solution at lower parts on one end and on another end in the longitudinal direction of the vessel proper, respectively, and an outlet for volatile matters at the upper part of the vessel proper, and a stirring rotor rotating in the proximity of the inside wall of the vessel proper is provided in the longitudinal direction of the vessel proper, the stirring rotor in the vessel proper is provided with a plurality of stirring blade blocks in accordance with the viscosity of the process solution, and the stirring blades are without any rotating shaft along the center of the stirring rotor.

5. An apparatus according to claim 2, wherein the fourth reactor is a horizontal, approximately cylindrical vessel type reactor having an inlet and an outlet for a process solution at lower parts on one end and on another end in the longitudinal direction of the vessel proper, respectively, and an outlet for volatile matters at the upper part of the vessel proper, the reactor has two stirring rotors rotating in the proximity of the inside wall of the vessel proper in the longitudinal direction of the vessel proper, and the rotors each have stirring blades.

6. An apparatus according to claim 1 or 2, wherein the second reactor is a vertical cylindrical vessel having two partitioned concentrical reaction compartments therein, each of the reaction chambers being provided with stirring blades and a heating coil, the stirring blades being fixed to one common, half length rotating shaft connected to a driving means mounted on the upper part of the vessel, and an outlet for volatile matters being provided at the upper part of the vessel.

7. An apparatus according to claim 1 or 2, wherein the second reactor is a vertical cylindrical vessel having two partitioned reaction compartments therein, the stirring blades provided in the inner reaction compartment are without any counterpart rotating shaft along the rotation center.

8. An apparatus according to claim 1 or 2, wherein the polymer produced in the second reactor has an average degree of polymerization of 20 to 70.

9. A process for continuously producing polybutylene terephthalate, which comprises producing an oligomer with an average degree of polymerization of 2 to 5 by reaction of an aromatic dicarboxylic acid comprising terephthalic acid as a main ingredient or a derivative thereof with a glycol comprising 1,4-butanediol as a main ingredient and than polycondensing the oligomer in series of a plurality of reactors, thereby producing a polymer of a low degree of polymerization and a high molecular weight polyester, characterized in that production of polymer of a low degree of polymerization by polycondensation of the oligomer is carried out in a vertical cylindrical polymerization vessel having a plurality of partitioned concentrical reaction compartments therein, each of the reaction compartments being provided with stirring blades and a heater, and an outlet for volatile matters being provided at the upper part of the vessel, the polycondensation reaction is efficiently carried out, while a process solution to be treated in the reaction compartments is successively transferred radially and inwardly from the outer reaction compartment to the inner one.

10. A process according to claim 9, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2 to 5, a second step of polycondensing the oligomer from the first step in a second reactor, thereby preparing a low polymerization product with an average degree of polymerization of 20 to 70, and a third step of further polycondensing the low polymerization product from the second step in a third reactor, thereby producing a high molecular weight polyester with an average degree of polymerization of 70 to 180, where the second reactor is a vertical cylindrical polymerization vessel having a plurality of partitioned concentrical reaction compartments therein, each of the reaction compartments being provided with stirring blades and a heater, and an outlet for volatile matters being provided at the upper part of the vessel, the polycondensation reaction is efficiently carried out, while the process solution to be treated in the reaction compartments is successively transferred radially and inwardly from the outer reaction compartment to the inner one.

11. A process for according to claim 9, which comprises a first step of reacting an aromatic dicarboxylic acid comprising terephthalic acid as a main ingredient or a derivative thereof with a glycol comprising 1,4-butanediol as a main ingredient in a first reactor, thereby producing an oligomer with an average degree of polymerization of 2 to 5, a second step of polycondensing the oligomer from the first step in a second reactor, thereby preparing a low polymerization product with an average degree of polymerization of 20 to 70, a third step of further polycondensing the low polymerization product from the second step in a third reactor, thereby producing a high molecular weight polyester with an average degree of polymerization of 70 to 130, and a fourth step of further polycondensing the polyester from the third step in a fourth reactor, thereby producing a high molecular weight polyester with an average degree of polymerization of 150 to 200, where the second reactor is a vertical cylindrical polymerization vessel having a plurality of partitioned concentrical reaction compartments therein, each of the reaction compartments being provided with stirring blades and a heater, and an outlet for volatile matters being provided at the upper part of the vessel, the polycondensation reactor is efficiently carried out, while a process solution to be treated in the reaction compartments is successively transferred radially and inwardly from the outer reaction compartment to the inner one.

12. A process according to claim 10 or 11, wherein the second step is carried out at a temperature of 230° to 250° C. and a pressure of 0.5 to 20 kPa and at 5 to 100 rpm of the stirring blades.

13. A process according to claim 10 or 11, wherein the third reactor is a horizontal cylindrical vessel type reactor having an inlet and an outlet for a process solution at lower parts on one end and on another end in the longitudinal direction of the vessel, respectively, and an outlet for volatile matters at the upper part of the vessel, and a stirring rotor rotating in the proximity of the inside wall of the vessel being provided in the longitudinal direction of the vessel proper, the stirring rotor being made of a plurality of stirring blade blocks in accordance with the viscosity of the process solution, and the stirring blades being without any rotating shaft along the center of the stirring rotor.

14. A process according to claim 11, wherein the third reactor is a horizontal cylindrical vessel type reactor having an inlet and an outlet for a process solution at lower parts on one end and an another end in the longitudinal direction of the vessel proper, respectively, and an outlet for volatile matters at the upper part of the vessel proper, and a stirring rotor rotating in the proximity of the inside wall of the vessel is provided in the longitudinal direction of the vessel, the stirring rotor in the vessel is provided with a plurality of stirring blade blocks in accordance with the viscosity of the process solution and the stirring blades are without any rotating shaft along the center of the stirring rotor, and the fourth reactor is a horizontal, approximately cylindrical vessel type reactor having an inlet and an outlet for a process solution at lower parts an one end and an another end in the longitudinal direction of the vessel, respectively, and an outlet for volatile matters at the upper part of the vessel, the reactor has two stirring rotors rotating in the proximity of the inside wall of the vessel in the longitudinal direction of the vessel, and the rotors each have stirring blades.

15. A process according to claim 10 or 11, wherein a slurry of the aromatic dicarboxylic acid comprising terephthalic acid as a main ingredient or a derivative thereof and the glycol comprising 1,4-butanediol as a main ingredient prepared in a ratio of the former to the latter of 1:1.7 to 1:3.0 is supplied to the first step upon admixture of an esterifying catalyst or a polymerization reaction catalyst.

16. A process according to claim 11, wherein another third reactor or a plurality of third reactors is provided in parallel to the third reactor in the third step, thereby producing different polybutylene terephthalates having different degrees of polymerization from those produced in the third and fourth reactors of the main series of the third and fourth steps, or adjusting operating conditions for each of the third reactors to control of increase in the product species, minute quality adjustment and production rate.

* * * * *